US009862788B2

(12) United States Patent
Hilf et al.

(10) Patent No.: US 9,862,788 B2
(45) Date of Patent: Jan. 9, 2018

(54) LOW-ODOUR (METH)ACRYLIC REACTION RESINS

(75) Inventors: Stefan Hilf, Rodenbach (DE); Alexander Klein, Gau-Algesheim (DE); Heike Heeb, Erlensee (DE); Ingrid Kizewski, Hanau (DE); Sebastian Grimm, Krombach (DE); Michael Flittner, Moembris (DE)

(73) Assignee: Evonik Roehm GmbH, Darmstadt (DE)

( * ) Notice: Subject to any disclaimer, the term of this patent is extended or adjusted under 35 U.S.C. 154(b) by 124 days.

(21) Appl. No.: 14/127,799

(22) PCT Filed: Jul. 2, 2012

(86) PCT No.: PCT/EP2012/062790
§ 371 (c)(1),
(2), (4) Date: Dec. 19, 2013

(87) PCT Pub. No.: WO2013/017350
PCT Pub. Date: Feb. 7, 2013

(65) Prior Publication Data
US 2014/0128536 A1 May 8, 2014

(30) Foreign Application Priority Data

Aug. 2, 2011 (DE) .................. 10 2011 109 139

(51) Int. Cl.
C08F 224/00 (2006.01)
C09D 4/06 (2006.01)
C09D 133/06 (2006.01)
C08F 220/18 (2006.01)
C08K 3/40 (2006.01)
C09D 5/00 (2006.01)
C08K 5/14 (2006.01)

(52) U.S. Cl.
CPC .......... *C08F 224/00* (2013.01); *C08F 220/18* (2013.01); *C08K 3/40* (2013.01); *C09D 4/06* (2013.01); *C09D 5/00* (2013.01); *C09D 133/066* (2013.01); *C08K 5/14* (2013.01)

(58) Field of Classification Search
CPC . C08F 220/18; C08F 2220/282; C08F 222/10
See application file for complete search history.

(56) References Cited

U.S. PATENT DOCUMENTS

| 3,256,254 | A | 6/1966 | Heinz et al. |
| 3,271,377 | A | 9/1966 | Mantel et al. |
| 4,207,155 | A | 6/1980 | Martin et al. |
| 4,401,797 | A * | 8/1983 | Gallop .................. C08F 220/12 351/159.33 |
| 4,451,629 | A * | 5/1984 | Tanaka .................. B29D 11/00 264/1.1 |
| 4,772,666 | A | 9/1988 | Just et al. |
| 7,049,355 | B2 | 5/2006 | Quis et al. |
| 2002/0058146 | A1 * | 5/2002 | Schwalm ............ C08F 290/147 428/423.1 |
| 2004/0096757 | A1 | 5/2004 | Tokuda et al. |
| 2007/0066704 | A1 | 3/2007 | Schwalm et al. |
| 2009/0253845 | A1 | 10/2009 | Neugebauer et al. |
| 2010/0168320 | A1 * | 7/2010 | Schwalm ............ C08G 18/4854 524/555 |
| 2011/0046332 | A1 | 2/2011 | Breiner et al. |
| 2012/0107493 | A1 | 5/2012 | Neugebauer et al. |
| 2012/0269963 | A1 | 10/2012 | Neugebauer et al. |

FOREIGN PATENT DOCUMENTS

| CA | 2 547 067 | 6/2005 |
| CA | 2 660 096 | 2/2008 |
| CA | 2 768 337 | 1/2011 |
| DE | 17 69 792 | 9/1971 |
| DE | 1769792 | 9/1971 |
| DE | 28 25 627 | 12/1979 |
| DE | 3323733 A1 * | 3/1984 ........... C03C 27/048 |

(Continued)

OTHER PUBLICATIONS

Translation of DE 3323733 A1, 1984.*
Applications: Free Radical Initiators, Polymer Products from Aldrich, 2017.*
International Search Report Issued Oct. 29, 2012 in PCT/EP12/062790 Filed Jul. 2, 2012.
U.S. Appl. No. 14/127,799, filed Dec. 19, 2013, Hilf, et al.
European Search Report issued Mar. 2, 2016, in European Patent Application No. 12734861.0.

(Continued)

*Primary Examiner* — Wenwen Cai
(74) *Attorney, Agent, or Firm* — Oblon, McClelland, Maier & Neustadt, L.L.P.

(57) ABSTRACT

The present invention relates to an innovative (meth)acrylic reactive resin which cures with low odor or odorlessly. The present invention relates more particularly to reactive resins comprising high-boiling, reactive (meth)acrylic monomers from the group of the polar, cyclically substituted esters of (meth)acrylic acid, more particularly glycerol acetal, ketal or carbonate methacrylates. These new components are used as substitutes for MMA, which represents the major part of the odor nuisance in the existing, prior-art reactive resin systems. Using these new components it is possible to obtain resin formulations which have glass transition temperatures similar to, and properties comparable with, MMA-based resins. The innovative reactive resins are able in addition to exhibit more rapid curing than prior-art MMA-based systems. Reactive resins for the purposes of the invention are reactive monomer mixtures or mixtures of monomers and polymers that when used as a 2-component system can be readily cured.

19 Claims, No Drawings

(56) References Cited

FOREIGN PATENT DOCUMENTS

| DE | 245 814 | 5/1987 |
|---|---|---|
| DE | 253 180 | 1/1988 |
| DE | 43 16 181 | 11/1994 |
| DE | 198 26 412 | 12/1999 |
| DE | 698 06 364 | 3/2003 |
| DE | 10 2006 039 849 | 2/2008 |
| EP | 0 272 664 | 6/1938 |
| EP | 0 272 664 | 6/1988 |
| EP | 0 398 585 | 11/1990 |
| EP | 0 871 676 | 10/1998 |
| EP | 1 803 784 | 7/2007 |
| EP | 1 927 603 | 6/2008 |
| EP | 2 412 768 | 2/2012 |
| JP | 58-65411 | 2/1916 |
| JP | 11-140146 | 9/1985 |
| JP | 60-173518 | 9/1985 |
| JP | 04198866 | 7/1992 |
| JP | 08-217837 | 8/1996 |
| JP | 2004-59435 | 2/2004 |
| JP | 2005-036081 | 2/2005 |
| JP | 2007-146071 | 6/2007 |
| WO | 98/33089 | 7/1998 |
| WO | 98/40424 | 9/1998 |
| WO | 2008/022861 | 2/2008 |
| WO | 2009/045703 | 4/2009 |

OTHER PUBLICATIONS

Office Action issued May 9, 2016 in Japanese Patent Application No. 2014-523252.

Kathryn a. Berchtold, et al.; "Rapid Solid-State Photopolymerization of Cyclic Acetal-Containing Acrylates"; Macromolecules, vol. 42(7); Mar. 13, 2009; 2433-2437.

Kathryn a. Berchtold, et al.; "Novel Monovinyl Methacrylic Monomers Containing Secondary functionality for Ultrarapid Polymerization: Steady-State Evaluation"; Macromolecules; vol. 37; Apr. 1, 2004; pp. 3165-3179.

Satyasankar Jana et al.; "Transparent, flexible and highly condutive oin gels from ionic liquid compatible cyclic carbonate network"; Chemical Communications; vol. 46; 2010; pp. 1488-1490.

Shanghai Haisun Chemtech Co., Ltd; Glycerol formal (fiche technique de 2004) http://www.haisun.cn/pl.htm Additional References sheet(s) attached.

Hui Lu et al.; "Development of highly reactive mono-(meth)acrylates as reactive diluents for dimethacrylate-based dental resin systems"; Biomaterials; vol. 26; 2005; pp. 1329-1336.

Niels Akeroyd et al.; "The combination of living radical polymerization and click chemistry for the synthesis of advanced macromelecular architectures"; European Polymer Journal; vol. 47; Issue 6; Jun. 2011; pp. 1207-1231.

M.J. Zohuriaan-Mehr, Ph.D.; "Synthesis of Isopropylidene Glycerol Methacrylate"; Research/Technical; Research Annual Report, Sarif Univ. Tech. Tehran, 1996.

William Aird Peden Black et al.; "Polymers and copolymers containing D-galactose residues"; Makromol. Chem.; 122(1); pp. 1-2.

Product data Sheet for Bisomer® IPGMA (structural formula) Particularly relevant (page/column.lin/fig.).

European Search Report issued Mar. 3, 2016, in European Patent Application No. 12734867.0 (Arkena France).

European Search Report issued Mar. 2, 2016, in European Patent Application No. 12734867.0 (Alteco Technik GmbH).

European Search Report issued Mar. 3, 2016, in European Patent Application No. 12734867.0 (Alexander Zolyomi).

* cited by examiner

LOW-ODOUR (METH)ACRYLIC REACTION RESINS

CROSS REFERENCE TO RELATED APPLICATION

This application is a 371 of PCT/EP2012/062790, filed on Jul. 2, 2012, and claims priority to German Patent Application 10 2011 109 139.8, filed on Aug. 2, 2011.

FIELD OF THE INVENTION

The present invention relates to an innovative (meth) acrylic reactive resin which cures with low odour or odourlessly. The present invention relates more particularly to reactive resins comprising high-boiling, reactive (meth) acrylic monomers from the group of the polar, cyclically substituted esters of (meth)acrylic acid, more particularly glycerol acetal, ketal or carbonate methacrylates. These new components are used as substitutes for MMA, which represents the major part of the odour nuisance in the existing, prior-art reactive resin systems. Using these new components it is possible to obtain resin formulations which have glass transition temperatures similar to, and properties comparable with, MMA-based resins. The innovative reactive resins are able in addition to exhibit more rapid curing than prior-art MMA-based systems. Reactive resins for the purposes of the invention are reactive monomer mixtures or mixtures of monomers and polymers that when used as a 2-component system can be readily cured.

PRIOR ART

Reducing the volatile component of a reactive resin of the kind used as a coating material, casting resin, for trafficway marking or as a floor coating, and hence reducing the odour nuisance caused when this formulation is applied, has been a goal of development for a relatively long time. Presently in use as reactive resins are systems based on reactive monomer mixtures or on a mixture of polymers and monomers, usually (meth)acrylate-based. The monomers here generally comprise a mixture of di- or trifunctional crosslinkers and standard components such as MMA. (Meth) acrylates, more particularly acrylates or methacrylates with small alkyl radicals, are monomers which possess a high vapour pressure, and hence their odour is easily perceived. When operating with acrylates it is necessary to comply with corresponding MAC levels. Reactive resins of these kinds are described in EP 0 973 835, for example.

DE 1 769 792 contains a reactive resin having a MMA fraction of between 30% and 70% by weight. DE 19 826 412 describes a cold-curing reactive (meth)acrylate resin whose odour is reduced by virtue of a relatively high fraction of vinylaromatics or vinyl esters. Even a reactive resin of this kind, however, still gives off a disruptive odour, and its long-term adhesion is reduced compared with that of established systems. EP 2 054 453 describes reactive resins which as well as 30% to 50% by weight of MMA contain up to 15% by weight of urethane (meth)acrylates. Systems of this kind as well have a relevant residual odour during application.

One alternative to pure (meth)acrylate systems are reactive resins comprising the use of unsaturated polyesters, as described in EP 0 871 678, for example. EP 0 871 676 describes the transfer of the same unsaturated bicyclic groups with a proton which is additionally easily abstractable from the polyesters to other polymers such as polyolefins or else polymethacrylates. These systems as well, however, contain predominantly very volatile monomer constituents.

WO 98/40424 describes 2- and 3-component formulations based on unsaturated polyesters in unsaturated ethylenic compounds or based on methacrylic polymers in methacrylic monomers. These systems as well have the same disadvantageous properties in terms of developing odour.

PROBLEM

The problem addressed by the present invention is that of providing a reactive resin which on application exhibits development of odour that is reduced significantly relative to the prior art. A particular problem addressed by the present invention is that of providing a reactive resin system which in toxicological and environmental aspects as well represents an improvement over the prior art.

A further problem is that of providing 2-component systems based on the reactive resins of the invention, for use, for example, as trafficway marking or floor coating, which should be able to be used widely and to be formulated flexibly and have a relatively long shelf life.

One particular problem is that of providing a reactive resin which enables trafficway markings that are at least as long-lived as those of the prior art and which have good retroreflection properties, good day and night visibility, a high, stable whiteness and a good grip, even when the trafficway is wet, or long-lived floor coatings having good surface properties, cohesion and adhesion to the substrate.

Further problems not explicitly identified will become apparent from the overall context of the subsequent description, claims and examples.

SOLUTION

The problems are solved by the provision of an innovative reactive resin, more specifically by provision of a (meth) acrylate-based reactive resin comprising monomers having cyclic radicals which contain at least 2 oxygen atoms.

The reactive resin of the invention comprises the following ingredients:
a) 0.5% to 30% by weight of crosslinker(s), preferably dimethacrylates,
b) 5% to 99.5%, preferably to 96%, by weight of an ester of (meth)acrylic acid with an alcohol having a cyclic radical containing at least two oxygen atoms,
c) 0%, preferably 3.5% to 90%, by weight of further (meth)acrylates and/or components copolymerizable with (meth)acrylates,
d) 0% to 5% by weight of either accelerator or initiator and optionally other auxiliaries.

Component a), the crosslinkers, comprises, more particularly, polyfunctional (meth)acrylates such as allyl (meth) acrylate. Particularly preferred are di- or tri-(meth)acrylates such as, for example, 1,4-butanediol di(meth)acrylate, tetraethylene glycol di(meth)acrylate, triethylene glycol di(meth)acrylate or trimethylolpropane tri(meth)acrylate. The crosslinker fraction is with more particular preference between 2% and 20% by weight and with very particular preference between 3% and 15% by weight.

Component b) comprises in particular an ester of (meth) acrylic acid with an acetal, ketal or carbonate of glycerol, substituted glycerol or unsubstituted or substituted trimethylolpropane. More particularly, component b) comprises monomers of the general structural formulae (1) or (2):

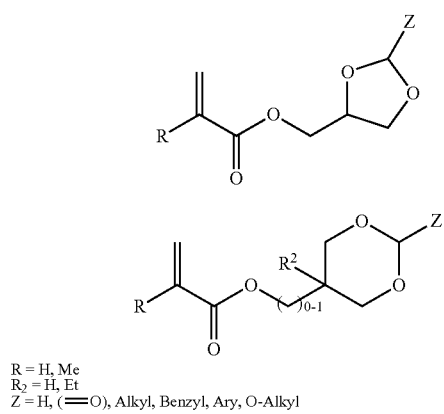

R = H, Me
R₂ = H, Et
Z = H, (=O), Alkyl, Benzyl, Ary, O-Alkyl

Component b) comprises more preferably glycerol formal (meth)acrylate, trimethylolpropane formal(meth)acrylate or isopropylideneglycerol (meth)acrylate (Solketal methacrylate).

In a composition particularly suitable for road markings, the reactive resin may further comprise 1% to 60% by weight of a component e), which comprises one or more prepolymers, preferably poly(meth)acrylates or polyesters.

The further monomers of component c) that are present in the reactive resin are more particularly compounds selected from the group of the (meth)acrylates, such as, for example, methyl (meth)acrylate, ethyl (meth)acrylate, n-butyl (meth)acrylate, 2-ethyl-hexyl (meth)acrylate, hydroxyethyl (meth)acrylate, stearyl (meth)acrylate, benzyl (meth)acrylate or lauryl (meth)acrylate. In component c) here it is also possible for there to be monomers which are miscible with (meth)acrylates, such as itaconic acid, methacrylamides, 1-alkenes or styrenes. The reactive resin preferably contains not more than 10% by weight, more preferably not more than 5% by weight and very preferably not more than 2% by weight of (meth)acrylates having radicals of between 1 and 6 carbon atoms.

It is also possible, furthermore, to use macromolecular monomers such as mono(meth)acrylates of polyethers, for example polyethylene glycols or polypropylene glycols. Alternative macromolecular monomers as component c) are represented by urethane (meth)acrylates. Urethane (meth)acrylates in the context of this invention are understood to be compounds having (meth)acrylate functionalities which are linked to one another via urethane groups. They are obtainable, for example, through the reaction of hydroxyalkyl (meth)acrylates with polyisocyanates and polyoxyalkylenes which have at least two hydroxyl functionalities. One commercially available example, prepared from polyols, isocyanates and hydroxy-functional methacrylates, is Ebecryl 210-5129 from UCB Chemicals. A reactive resin of the invention may comprise between 5% and 30% by weight of the above-described urethane (meth)acrylates.

Component c) is selected specifically, in proportion and composition, in line, advantageously, with the desired technical function.

The monomer fraction of the reactive resin is more particularly between 10% and 85% by weight for systems composed exclusively of monomers, and preferably between 10% and 60% by weight for systems known as MO-PO systems, of the kind described below.

In an alternative embodiment which is especially suitable as road marking or floor coating, the reactive resin further comprises component e). In these systems, known as MO-PO systems (monomer-polymer systems), therefore, in addition to the stated monomers, there are also polymers, identified for the purpose of distinctiveness in the context of this patent as prepolymers, preferably polyesters or poly(meth)acrylates. The prepolymers are used for improving the polymerization properties, the mechanical properties, the adhesion to the substrate and the optical requirements imposed on the resins. The prepolymer fraction of the reactive resin in this embodiment is between 10% and 60% by weight, preferably between 15% and 40% by weight. Both the polyesters and the poly(meth)acrylates may contain additional functional groups for imparting adhesion or for copolymerization in the crosslinking reaction, such as, for example, in the form of double bonds. Preferably, however, with a view to improved colour stability on the part of the trafficway marking, the prepolymers contain no double bonds. The said poly(meth)acrylates are generally composed of the same monomers as already listed above for the monomers in the resin system. They can be obtained by solution, emulsion, suspension, bulk or precipitation polymerization, and are added as pure substances to the system.

Said polyesters are obtained in bulk via polycondensation or ring-opening addition polymerization, and are composed of the building blocks known for these applications.

These reactive resins of the invention are used as a basis for producing formulations which make up one of optionally two to three components of a cold plastic likewise of the invention. In this case there are two preferred embodiments. The first is a pure monomer system. These formulations comprise, in accordance with the invention, the following components:

5% to 99% by weight of the reactive resin of the invention, comprising at least 0.1% by weight of one or more accelerators or initiators d), and 0.1% to 5% by weight of a mixture comprising one or more accelerators or initiators f), where component d) comprises an initiator and at the same time component f) comprises an accelerator, or component d) comprises an accelerator and component f) comprises an initiator.

In the second embodiment, which is a MO-PO system, the cold plastic has the following components:

9% to 45% by weight of the reactive resin of the invention, preferably comprising at least 0.1% by weight of one or more accelerators or initiators d), 0.1% to 5% by weight of a mixture comprising one or more initiators or accelerators f), 0% to 15% by weight of an inorganic pigment, preferably titanium dioxide, and 10% to 90% by weight of glass beads, organic or further mineral fillers, where component d) comprises an initiator and at the same time component f) comprises an accelerator, or alternatively component d) comprises an accelerator and component f) comprises an initiator.

In both embodiments, initiators and accelerators are separate prior to mixing, in different components of the cold plastic.

In variants of both embodiments, two reactive resins of the invention are mixed with one another in a weight ratio between 1:1 and 4:1, with one reactive resin comprising component d) and the other reactive resin comprising component f).

Serving as initiators d) and f)—more specifically, polymerization initiators—are peroxides. In some circumstances it may be advantageous to use a mixture of different initiators. Preference is given to using peroxides such as dilauroyl peroxide, dibenzoyl peroxide, tert-butyl peroctoate, di-tertbutyl peroxide (DTBP), di-tert-amyl peroxide (DTAP), tert-butyl peroxy(2-ethylhexyl)carbonate (TBPEHC) and other peroxides which decompose at a high temperature, as radical initiators. For reactive resins for application, for example, for trafficway markings, dilauroyl peroxide or dibenzoyl peroxide are particularly preferred. Generally speaking, the peroxide in the second component is admixed with a diluent, as for example with a phthalate such as dibutyl phthalate, with an oil or with another plasticizer. The cold plastic of the invention, as a sum of the first and second components and also, optionally, the third component, comprises between 0.1% and 7% by weight, preferably between 0.5% and 6% by weight and very preferably between 1% and 5% by weight of the initiator or of the mixture of the initiator and the diluent.

One particular embodiment of a redox initiator system for reactive resins is the combination of peroxides and accelerators g), more particularly amines. Said amines include, for example, tertiary, aromatically substituted amines, such as more particularly N,N-dimethyl-p-toluidine, N,N-bis(2-hydroxyethyl)-p-toluidine or N,N-bis(2-hydroxy-propyl)-p-toluidine. The reactive resin of the invention may comprise up to 7%, preferably up to 5% and very preferably up to 3% by weight of an accelerator.

In an alternative embodiment of a 3-component system, suitable more particularly for trafficway markings, the accelerator is present in the second component, for example in a diluent, and the initiator, for example the peroxide, is part of the reactive resin of the invention. The third component comprises, for example, glass beads and any adhesion promoters required. Alternatively, the accelerator is part of the reactive resin and the initiator or initiators are part of a second or third component of the reactive resin.

The components of the cold plastics described can be mixed before or during application.

In addition there may be other auxiliaries present, such as stabilizers, examples being UV stabilizers, inhibitors, chain transfer agents or waxes. The individual components may also comprise other auxiliaries such as defoamers, rheological additives, flow control assistants, wetting agents and/or dispersants, a grippy (slip-resistant) filler, and anti-settling agents. It is also possible, especially for trafficway markings, for glass beads, added for the purpose of improving the reflection, to be present in one of the components of the cold plastic or to be scattered on additionally during application.

In addition, depending on utility, colorants and fine and/or coarse fillers may be added to the formulations.

For the field of use of the formulations as trafficway markings or surface markings, auxiliaries and additives added are preferably colorants. Particularly preferred are white, red, blue, green and yellow inorganic pigments, particular preference being given to white pigments such as titanium dioxide.

Fine fillers used are from the group of the calcium carbonates, barium sulphates, quartzes, finely ground quartzes, precipitated and fumed silicas, pigments and crystobalites. Coarse fillers used are quartzes, crystobalites, corundums and aluminium silicates.

As auxiliaries and additives it is additionally possible to use chain transfer agents, plasticizers, paraffins, stabilizers, inhibitors, waxes and/or oils.

The paraffins are added in order to prevent inhibition of polymerization by atmospheric oxygen. For this purpose it is possible to use two or more paraffins having different melting points, in different concentrations.

As chain transfer agents it is possible to use all of the compounds known from radical polymerization. Preference is given to using mercaptans such as n-dodecyl mercaptan, but also polyfunctional mercapto compounds such as pentaerythritol tetrathioglycolate. As plasticizers it is preferred to use esters, polyols, oils, low molecular mass polyethers or phthalates.

It is also possible to use conventional UV stabilizers. The UV stabilizers are preferably selected from the group of benzophenone derivatives, benzotriazole derivatives, thioxanthonate derivatives, piperidinolcarboxylic ester derivatives or cinnamic ester derivatives.

From the group of the stabilizers and/or inhibitors it is preferred to use substituted phenols, hydroquinone derivatives, phosphines and phosphites.

The following components may also optionally be present in formulations for trafficway marking:

wetting, dispersing and flow control assistants are preferably used that are selected from the group of alcohols, hydrocarbons, glycol derivatives, derivatives of glycolic esters, acetic esters and polysiloxanes, polyethers, polysiloxanes, polycarboxylic acids and saturated and unsaturated polycarboxylic acid amine amides.

As rheological additives it is preferred to use polyhydroxycarboxamides, urea derivatives, salts of unsaturated carboxylic acid esters, alkylammonium salts of acidic phosphoric acid derivatives, ketoximes, amine salts of p-toluenesulphonic acid, amine salts of sulphonic acid derivatives, and aqueous or organic solutions or mixtures of the compounds. It has been found that rheological additives based on fumed or precipitated silicas, including, optionally, silanized silicas, having a BET surface area of 10-700 $nm^2/g$ are particularly suitable.

Defoamers used are preferably selected from the group of alcohols, hydrocarbons, paraffin-base mineral oils, glycol derivatives, derivatives of glycolic esters, acetic esters and polysiloxanes.

These formulation freedoms show that the reactive resin of the invention or the cold plastic of the invention comprising the reactive resin can be formulated and additized for each specific application.

The possible uses for the cold plastics of the invention are multifarious. For instance, such cold plastics are suitable especially for the production of trafficway markings, trafficway repair compositions, intumescent coatings or floor coatings. Their use in the production of cobblestones is also possible.

Cold plastics without solid formulating ingredients such as fillers can also be used, for example, as a floor coating, casting resin, architectural preservative, coating material or laminating material—for orthopaedic resins, for example—and also for producing prepregs. Use as reactive adhesives is another possibility.

Surprisingly it has been found that the reactive resins of the invention and also the cold plastics produced from them are distinguished by very good properties such as long life, mechanical properties, abrasion resistance, optionally whiteness or pigmentation, and grip, all of which are at least as good as in prior-art systems. Furthermore, however, the systems of the invention are distinguished relative to the prior art by particularly low development of odour and release of volatile constituents. The co-formulation of component b) makes it possible, where further monomers are selected, to do entirely without, in particular, highly odorous monomers such as ethyl acrylate, without impairing the other properties of the cold plastic.

The system can also be optimized in respect of the applications by selecting appropriate monomers, prepolymers, additives and/or adhesion promoters. Accordingly, the systems of the invention can be variably optimized and used for a wide variety of applications. For road markings, for example, the marking of surfaces of asphalt, concrete or natural stone is entirely possible.

The systems of the invention can be employed flexibly in terms of the application technology as well. The reactive resins and cold plastics of the invention can be applied by spraying, casting or extrusion processes.

The examples given below are given for better illustration of the present invention, but are not such as to restrict the invention to the features disclosed therein.

EXAMPLES

Materials Used

Polymer components used were Degalan LP 64/12 and Degalan LP 66/02 (both from Evonik Röhm). These are suspension polymers containing methyl methacrylate and n-butyl methacrylate in different proportions and having weight-average molar masses $M_w$ of between 30 000 and 90 000 g/mol (determined by SEC against PMMA standards).

The pot life was ascertained by determining the time taken for the material, after stirred incorporation of the curing agent, to warm up by itself from room temperature (20-22° C.) to 32° C.

The viscosities of the reactive resin mixtures were measured using a Brookfield DV2, spindle 2, at 12 revolutions per minute.

For the determination of the $t_{max}$, the time used was that taken by 20 g of resin in a PE beaker with a diameter of 45 mm to reach the maximum temperature ($T_{max}$) in the course of curing.

For the determination of the VOC levels, a gravimetric measurement was carried out in agreement with ASTM D2369-10, method E.

Example 1

94 parts by weight of glycerol formal methacrylate and 1 part by weight of 1,4-butane-diol dimethacrylate are admixed with 0.06 part by weight of Topanol-O, 0.5 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 2

94 parts by weight of isopropylideneglycerol methacrylate, 1 part by weight of triethylene glycol dimethacrylate are admixed with 0.06 part by weight of Topanol-O, 0.5 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 3

84 parts by weight of glycerol formal methacrylate, 9 parts of glycerol formal acrylate and 5 parts by weight of 1,4-butanediol dimethacrylate are admixed with 0.06 part by weight of Topanol-O, 0.6 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 4

56 parts by weight of glycerol formal methacrylate, 37 parts of glycerol formal acrylate and 5 parts by weight of 1,4-butanediol dimethacrylate are admixed with 0.06 part by weight of Topanol-O, 0.6 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 5

56 parts by weight of glycerol formal methacrylate, 37 parts of glycerol formal methacrylate and 5 parts by weight of 1,4-butanediol dimethacrylate are admixed with 0.06 part by weight of Topanol-O, 0.6 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 6

84 parts by weight of glycerol formal methacrylate, 9 parts of glycerol formal methacrylate and 5 parts by weight of 1,4-butanediol dimethacrylate are admixed with 0.06 part by weight of Topanol-O, 0.6 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

TABLE 1

Cure behaviour of cold plastics without prepolymers, in different mixtures of comonomers, to illustrate the adjustability of the hardness of the cured material:

| Example | Pot life [min] | Tmax [° C.] | tmax [min] | Surface tack-free | ShoreD |
| --- | --- | --- | --- | --- | --- |
| 3 | 4 | 166.0 | 6.00 | yes | 76 |
| 4 | 3 | 185.0 | 4.50 | yes | 71 |
| 5 | 3.25 | 189.0 | 4.75 | yes | 33 |
| 6 | 3 | 194.0 | 4.25 | yes | 16 |

Example 7

34 parts by weight of isopropylideneglycerol methacrylate, 19 parts of 2-ethylhexyl acrylate, 9 parts by weight of hydroxypropyl methacrylate and 8.5 parts by weight of triethylene glycol dimethacrylate are admixed with 0.06 part by weight of Topanol-O, 19 parts by weight of Degalan LP 66/02, 7 parts by weight of Degalan LP 64/12, 0.9 part by weight of Sasolwax 5603 and 1.5 parts by weight of N,N-di-2-hydroxypropyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 8

34 parts by weight of glycerol formal acrylate, 35 parts of n-butyl acrylate and 2 parts by weight of 1,4-butanediol dimethacrylate are admixed with 0.06 part by weight of Topanol-O, 25 parts by weight of Degalan LP 66/02, 0.5 part by weight of Sasolwax 5603, 1.5 parts by weight of N,N-di-2-hydroxypropyl-p-toluidine and 0.4 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 9

37 parts by weight of glycerol formal methacrylate, 37 parts of 2-ethylhexyl acrylate and 2 parts by weight of triethylene glycol dimethacrylate are admixed with 0.07 part by weight of Topanol-O, 20 parts by weight of Degalan LP 64/12, 1.5 parts by weight of Sasolwax 5603, 0.7 part by weight of N,N-di-2-hydroxypropyl-p-toluidine and 0.3 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 10

35 parts by weight of glycerol formal methacrylate, 39 parts of 2-ethylhexyl methacrylate and 2.5 parts by weight of triethylene glycol dimethacrylate are admixed with 0.07 part by weight of Topanol-O, 20 parts by weight of Degalan LP 64/12, 1.5 parts by weight of Sasolwax 5603, 0.7 part by weight of N,N-di-2-hydroxypropyl-p-toluidine and 0.8 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 11

37 parts by weight of glycerol formal methacrylate, 33 parts of 2-ethylhexyl acrylate, 5 parts of 2-hydroxyethyl methacrylate and 2 parts by weight of triethylene glycol dimethacrylate are admixed with 0.07 part by weight of Topanol-O, 17 parts by weight of Degalan LP 66/02, 3 parts by weight of Degalan LP 64/12, 1.4 parts by weight of Sasolwax 5603, 0.7 part by weight of N,N-di-2-hydroxypropyl-p-toluidine and 0.3 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 12

37 parts by weight of glycerol formal methacrylate, 33 parts of 2-ethylhexyl acrylate, 5 parts of 2-hydroxypropyl methacrylate and 2 parts by weight of triethylene glycol dimethacrylate are admixed with 0.07 part by weight of Topanol-O, 17 parts by weight of Degalan LP 66/02, 3 parts by weight of Degalan LP 64/12, 1.4 parts by weight of Sasolwax 5603, 0.7 part by weight of N,N-di-2-hydroxypropyl-p-toluidine and 0.3 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 13

43 parts by weight of glycerol formal methacrylate, 33 parts of 2-ethylhexyl acrylate, 5 parts of 2-hydroxypropyl methacrylate and 2 parts by weight of triethylene glycol dimethacrylate are admixed with 0.07 part by weight of Topanol-O, 17 parts by weight of Degalan LP 66/02, 3 parts by weight of Degalan LP 64/12, 1.5 parts by weight of Sasolwax 5603, 0.7 part by weight of N,N-di-2-hydroxypropyl-p-toluidine and 0.3 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

Example 14

38 parts by weight of glycerol formal methacrylate, 33 parts of 2-ethylhexyl acrylate, 5 parts of 2-hydroxypropyl methacrylate and 1 part by weight of triethylene glycol dimethacrylate are admixed with 0.07 part by weight of Topanol-O, 17 parts by weight of Degalan LP 66/02, 3 parts by weight of Degalan LP 64/12, 1.5 parts by weight of Sasolwax 5603, 0.3 part by weight of N,N-di-2-hydroxypropyl-p-toluidine and 0.2 part by weight of N,N-dimethyl-p-toluidine and the constituents are mixed with vigorous stirring at 63° C. until they have all dissolved. The resin is subsequently left to cool to 23° C. with stirring. For curing, the resin is admixed with 2 percent by weight of curing agent powder (50% BPO in dicyclohexyl phthalate), stirred for a minute and then applied in a film thickness of about 2 mm to a metal surface.

TABLE 2

Cold plastics for demonstrating the adjustability of the reactivity and the viscosity of the reactive resins of the invention and also the tack-free state of the cured resins with different comonomers.

| Example No. | Pot life (min) | tmax (min) | Tmax (° C.) | Visc. (mPas) | Tack-free |
|---|---|---|---|---|---|
| 1 | 5 | 8 | 150 | <10 | yes |
| 2 | 9 | 13 | 104 | <10 | yes |
| 8 | 6 | 6.5 | 109 | 150 | yes |
| 9 | 11 | 15 | 96 | 170 | yes |
| 10 | 5 | 7.7 | 101 | 185 | yes |
| 11 | 13 | 19 | 94 | 250 | yes |
| 12 | 12 | 15 | 98 | 270 | yes |
| 13 | 13 | 10 | 117 | 220 | yes |
| 14 | 17 | 12 | 131 | 210 | yes |

Example 15

The reactive resin obtained from Example 9 is processed with 10 parts by weight of titanium dioxide (TR 92), 54.6 parts by weight of fine filler (Omyacarb 15 GU), 0.3 part by weight of a dispersing assistant (TEGO® Dispers 670) and 0.1 part by weight of rheological additive (Byk 410) with dispersing to form a trafficway marking paint. In this processing operation, the resin is introduced to start with, a portion of the rheological additive is incorporated with dispersion over a period of 5 minutes, followed by the dispersing assistant, likewise over 5 minutes, and followed in turn by the titanium dioxide and the fine filler, each for a further 10 minutes. Lastly, the remainder of the dispersing assistant is incorporated.

For curing, the processed resin is admixed with 2 percent by weight of curing agent powder (50% BPO in dicyclohexyl phthalate), stirred for a minute and then knife-coated in a film thickness of 1 mm onto a PET surface.

Example 16

The reactive resin obtained from Example 10 is processed with 10 parts by weight of titanium dioxide (TR 92), 54.6 parts by weight of fine filler (Omyacarb 15 GU), 0.3 part by weight of a dispersing assistant (TEGO® Dispers 670) and 0.1 part by weight of rheological additive (Byk 410) with dispersing to form a trafficway marking paint. In this processing operation, the resin is introduced to start with, a portion of the rheological additive is incorporated with dispersion over a period of 5 minutes, followed by the dispersing assistant, likewise over 5 minutes, and followed in turn by the titanium dioxide and the fine filler, each for a further 10 minutes. Lastly, the remainder of the dispersing assistant is incorporated.

For curing, the processed resin is admixed with 2 percent by weight of curing agent powder (50% BPO in dicyclohexyl phthalate), stirred for a minute and then knife-coated in a film thickness of 1 mm onto a PET surface.

Comparative Example 1

34 parts by weight of methyl methacrylate, 35 parts of n-butyl acrylate and 1.6 parts by weight of triethylene glycol dimethacrylate are admixed with 0.06 part by weight of Topanol-O, 23 parts by weight of Degalan LP 66/02, 4 parts by weight of Degalan LP 64/12, 1.3 parts by weight of Sasolwax 5603, 0.6 part by weight of N,N-di-2-hydroxypropyl-p-toluidine and 0.3 part by weight of N,N-dimethyl-p-toluidine and the constituents are mixed with vigorous stirring at 63° C. until they have all dissolved. The resin is subsequently left to cool with stirring to 23° C. The reactive resin thus obtained is processed with 10 parts by weight of titanium dioxide (TR 92), 54.6 parts by weight of fine filler (Omyacarb 15 GU), 0.3 part by weight of a dispersing assistant (TEGO® Dispers 670) and 0.1 part by weight of rheological additive (Byk 410) with dispersing to form a trafficway marking paint.

In this processing operation, the resin is introduced to start with, a portion of the rheological additive is incorporated with dispersion over a period of 5 minutes, followed by the dispersing assistant, likewise over 5 minutes, and followed in turn by the titanium dioxide and the fine filler, each for a further 10 minutes. Lastly, the remainder of the dispersing assistant is incorporated.

For curing, the processed resin is admixed with 2 percent by weight of curing agent powder (50% BPO in dicyclohexyl phthalate), stirred for a minute and then knife-coated in a film thickness of 1 mm onto a PET surface.

TABLE 3

Comparison of a conventional cold plastic for road markings with fillers, based on MMA and other volatile comonomers, with resins of the invention, and also VOC values:

| | Comparative Example 1 | Example 15 | Example 16 |
|---|---|---|---|
| Shore D after 24 h | 40 | 44 | 42 |
| Shore D after 3 d | 44 | 45 | 42 |
| Pot life [min] | 10 | 2.5 | 4 |
| Cure time [min] | 30 | 25 | 35 |
| VOC [% by weight]* | 1.9 (Comparative Example 2) | 1.0 | 0.9 |

*The VOC values were carried out with the filler-free cold plastics. Specifically, therefore, the cold plastic from Example 15 corresponds to the cold plastic from Example 9, and the cold plastic from Example 16 corresponds to the cold plastic from Example 10. Comparative Example 2 corresponds to Comparative Example 1 without fillers.

The invention claimed is:

1. A composition, comprising:
    a) 0.5% to 30% by weight of a dimethacrylate;
    b) 5% to 96% by weight of at least one of glycerol formal(meth)acrylate and trimethylolpropane formal (meth)acrylate;
    c) 3.5% to 90% by weight of a (meth)acrylate, a monomer miscible with a (meth)acrylate, or both;
    d) a peroxide thermal initiator; and
    e) 1% to 60% by weight of a poly(meth)acrylate or a polyester, wherein the composition does not contain a urethane (meth)acrylate.

2. The composition according to claim 1, comprising glycerol formal(meth)acrylate as the component b).

3. The composition according to claim 1, further comprising an accelerator f) in an amount of no greater than 5% by weight.

4. The composition according to claim 1, wherein component b) is a combination of glycerol formal(meth)acrylate and trimethylolpropane formal(meth)acrylate.

5. The composition according to claim 1, wherein component b) is glycerol formal(meth)acrylate.

6. The composition according to claim 1, comprising trimethylolpropane formal(meth)acrylate as the component b).

7. The composition according to claim 1, comprising glycerol formal methacrylate and glycerol formal acrylate as the component b).

8. The composition according to claim 1, comprising at least one of itaconic acid, a methacrylamide and a 1-alkene, as the component c).

9. The composition according to claim 1, comprising a styrene as the component c).

10. The composition according to claim 1, comprising 1% to 60% by weight of the poly(meth)acrylate.

11. A composition, comprising:
a) 0.5% to 30% by weight of dimethacrylate;
b) 5% to 96% by weight of at least one of glycerol formal(meth)acrylate and trimethylolpropane formal (meth)acrylate;
c) 3.5% to 90% by weight of a (meth)acrylate, a monomer miscible with a (meth)acrylate, or both;
d) a peroxide thermal initiator; and
e) 1% to 60% by weight of a poly(meth)acrylate or a polyester, wherein the composition does not contain methyl methacrylate.

12. The composition according to claim 11, comprising 1% to 60% by weight of the poly(meth)acrylate.

13. A cold plastic, comprising:
5% to 99% by weight of the composition according to claim 1, the composition comprising at least 0.1% by weight of the peroxide thermal initiator d) relative to a total weight of the composition; and
0.1% to 5% by weight of an accelerator f), wherein:
the peroxide thermal initiator d) and the accelerators f) are present separately from one another before the cold plastic is produced.

14. The cold plastic according to claim 13, comprising:
9% to 45% by weight of the composition, the composition comprising at least 0.1% by weight of the peroxide thermal initiator d) relative to the total weight of the composition;
0.1% to 5% by weight of the accelerator f);
0% to 15% by weight of a inorganic pigment; and
10% to 90% by weight of glass beads, at least one organic filler or at least one mineral filler.

15. The cold plastic according to claim 13, comprising an amine as the accelerator f).

16. The cold plastic according to claim 15, wherein:
the peroxide thermal initiator d) is dilauroyl peroxide, dibenzoyl peroxide, or both; and
the amine is a tertiary, aromatically substituted amine.

17. The cold plastic according to claim 13, wherein the composition and the accelerator f) are mixed before or during application of the cold plastic.

18. The cold plastic according to claim 13, wherein the cold plastic is adapted to function as a cold plastic for producing a trafficway marking, a trafficway repair composition, an intumescent coating, or a floor coating.

19. The cold plastic according to claim 13, wherein the cold plastic is adapted to function as a casting resin, an architectural preservative, a coating material or a laminating material.

* * * * *